United States Patent [19]
Nomura et al.

[11] Patent Number: 5,760,510
[45] Date of Patent: Jun. 2, 1998

[54] MAGNETIC BEARING DEVICE

[75] Inventors: Shinichi Nomura; Toshiharu Kogure, both of Narashino, Japan

[73] Assignee: Seiko Seiki Kabushiki Kaisha, Japan

[21] Appl. No.: 500,539

[22] Filed: Jul. 11, 1995

[51] Int. Cl.⁶ .................................................. H02K 7/09
[52] U.S. Cl. .................................................. 310/90.5
[58] Field of Search .................................................. 310/90.5

[56] References Cited

U.S. PATENT DOCUMENTS

| | | | |
|---|---|---|---|
| 4,626,754 | 12/1986 | Habermann et al. | 318/460 |
| 4,992,714 | 2/1991 | Matsushita et al. | 318/625 |
| 4,999,534 | 3/1991 | Andrianos | 310/90.5 |
| 5,013,987 | 5/1991 | Wakui | 318/632 |
| 5,130,589 | 7/1992 | Kanemitsu | 310/90.5 |
| 5,202,824 | 4/1993 | Chen | 364/508 |
| 5,247,219 | 9/1993 | Nakagawa et al. | 310/90.5 |

*Primary Examiner*—Steven L. Stephan
*Assistant Examiner*—Michael Wallace, Jr.
*Attorney, Agent, or Firm*—Adams & Wilks

[57] ABSTRACT

A magnetic bearing device comprises a rotor, electromagnets, radial direction displacement sensors, and a control circuit for controlling an exciting current of the electromagnets in accordance with a signal from the radial direction displacement sensors to magnetically levitate the rotor. The control circuit comprises a position detecting circuit, a calculator, a PID operating part, a phase inverter and power amplifiers. A CPU analyzes the displacement of the rotor at the time of rotation on the basis of a sensor signal issued from the position detecting circuit to supply a correction signal obtained as a result of analysis to the calculator. A magnetic force is thus generated which offsets the oscillation of the rotor for each of the frequency components and is supplied to the electromagnets. The magnetic bearing device is capable of inhibiting displacement components of the rotor other than a first order component in the rotation frequency of the rotor.

15 Claims, 4 Drawing Sheets

MAGNETIC BEARING DEVICE

BACKGROUND OF THE INVENTION

The present invention relates to a magnetic bearing device that can inhibit a displacement of a rotor during rotation thereof.

Generally, magnetic bearing devices magnetically levitate a rotor to support the rotor without contacting it. The magnetic bearing devices control the levitating position of the rotor by the feedback control of the exciting current of an electromagnet.

In this magnetic bearing device, when the rotor is ill-balanced, an undesirable oscillation and rotation (displacement) is generated. This displacement is given as an output change from a sensor for detecting an exciting current of the electromagnet, a sensor or the like for detecting a flux density in a gap formed between the electromagnet and the rotor. Consequently, a control gain of a specific frequency is remarkably lowered by eliminating the frequency (rotation frequency) component which corresponds to the rotation number of the rotor so that the oscillation and rotation are inhibited by rotating the rotor on an inert central shaft.

However, in an actual apparatus in which the magnetic bearing device is used, for example, a spindle or the like, a displacement of high order frequencies such as a second order frequency or a third order frequency is generated in addition to the first order component which synchronizes with the rotation frequency because of a mechanical structure of the apparatus (for example, it is impossible to arrange electromagnets opposite to the rotor without any error). Further, it sometimes happens that oscillation of other devices such as a pump or the like which is arranged in the vicinity of the spindle may affect the whole apparatus with the result that a displacement is generated at a rotation frequency or other frequencies other than higher harmonic waves (second order, third order, and so on).

In particular, in the magnetic bearing device used in the spindle, a tool is provided at a shaft end portion of the rotor. Thus, when a displacement is generated at the shaft end portion at the time of the rotation, the tool is also oscillated which impedes a precise processing. Further, in a spindle in which the tool is automatically exchanged with an automatic exchanger or the like, the mounting position of the tool may be shifted from the center of the shaft of the rotor. In this case, since the tool is oscillated at the time of the rotation, the processing precision is deteriorated in the same manner.

SUMMARY OF THE INVENTION

It is an object of the present invention to provide a magnetic bearing device which can inhibit an oscillation and rotation which are generated at the time of the rotation of a rotor.

To attain the aforementioned object, a magnetic bearing device of the present invention comprises an electromagnet for magnetically levitating a rotor, a displacement detecting means for detecting a displacement of said rotor, a compensating circuit for compensating a signal of said displacement detecting means for stably supporting said rotor on a shaft, a control means for controlling an exciting current of said electromagnet on the basis of the signal compensated by said compensating circuit, a rotation angle position detecting means for detecting a rotation angle position of said rotor, a rotation speed detecting means for detecting a rotation speed of said rotor, a frequency analyzing means for receiving a detection signal of the rotation speed detecting means and receiving a detection signal of said displacement detecting means synchronously with a detection signal of said rotation angle position for analyzing a frequency so that the displacement of the rotor for each rotation angle position is converted into a rotation frequency and the amplitude and the phase data of a higher harmonic wave component, a transfer function measuring means for measuring a closed loop transfer function of a feedback loop which extends over a displacement detection point to which said detection signal of said displacement detecting means from a position correction input point of said compensating circuit to which the detection signal of said displacement detecting means is input, a reverse transfer function calculating means for calculating a reverse transfer function from the transfer function measured by this transfer function measuring means, a correction signal generating means for calculating and generating a correction signal for inhibiting the displacement of said rotor from the amplitude and phase data obtained by said frequency analyzing means and the gain and phase data obtained from the reverse transfer function calculated by said reverse transfer function calculating means, and a correction signal supplying means for supplying the correction signal generated by the correction signal generating means to said position correction input point in synchronization with the detection signal of said rotation angle position detecting means.

Therefore, in the magnetic bearing device of the present invention, the rotation angle position detecting means detects the rotation angle position of the rotor. The rotation speed detecting means detects the rotation speed of the rotor. The frequency analyzing means receives the detection signal of the rotation speed detecting means, and at the same time receives the detection signal of the displacement detecting means in synchronization with the detection signal of the rotation angle position detecting means for the frequency analysis, thereby converting the displacement of the rotor for each rotation angle position into a rotation frequency and the amplitude and the phase data of the higher harmonic wave component. The transfer function measuring means measures a close loop transfer function of the feedback loop which extends from a position correction input point to which a detection signal of the displacement detecting means is input to the displacement detection point to which the detection signal of the displacement detecting means is output from the position correction input point of the compensating circuit. The reverse transfer function calculating means calculates the reverse transfer function from the transfer function measured by the transfer function measuring means. The correction signal generating means calculates and generates a correction signal for inhibiting the displacement of the rotor from the gain and the phase data obtained from the reverse transfer function calculated by the transfer function calculating means. The correction signal supplying means supplies a correction signal for inhibiting the displacement of the rotor from the amplitude and the phase data obtained from the reverse transfer function. Then, the correction signal supplying means supplies the correction signal generated by the correction signal generating means to the position correction input point in synchronization with the detection signal of the rotation angle position detecting means so that the aforementioned electromagnet generates a magnetic force for inhibiting the displacement of the rotor.

Further, the synchronous signal generating means generates a signal which is synchronous with the rotation frequency and a non-synchronous frequency other than the higher harmonic wave component, the rotation frequency being differentiated by a differentiating means from the frequency analysis and the rotation speed detection signal. The frequency analyzing means receives the detection signal of the displacement detecting means in synchronization with the synchronous signal and the frequency is analyzed at the same time so that the displacement of the rotor is converted into the non-synchronous frequency and the amplitude and the phase data of higher harmonic wave components at the time of rotation. The correction signal generating means calculates and generates a second correction signal from the non-synchronous frequency, the amplitude and the phase data of the higher harmonic wave components, and the gain and phase data obtained from the reverse transfer function for inhibiting the displacement of the non-synchronous rotor at the time of rotation. Then the correction signal supplying means supplies the second correction signal to a position correction input point in synchronization with the synchronous signal so that the electromagnet generates a magnetic force for inhibiting the non-synchronous displacement.

Further, the frequency analyzing means analyzes the frequency of the displacement having a cycle obtained by averaging a cyclic displacement detected a plurality of times by the displacement detecting means with an averaging means in accordance with the frequency of detection.

Further, an abnormality detecting means detects the abnormality of the rotor when at least the oscillation detecting means and the displacement detecting means for detecting the oscillation of the rotor detect the superfluous oscillation and superfluous displacement.

DETAILED DESCRIPTION OF THE INVENTION

Embodiments of the magnetic bearing device according to the present invention will be described in detail by referring to FIGS. 1 to 4.

Figure 1:
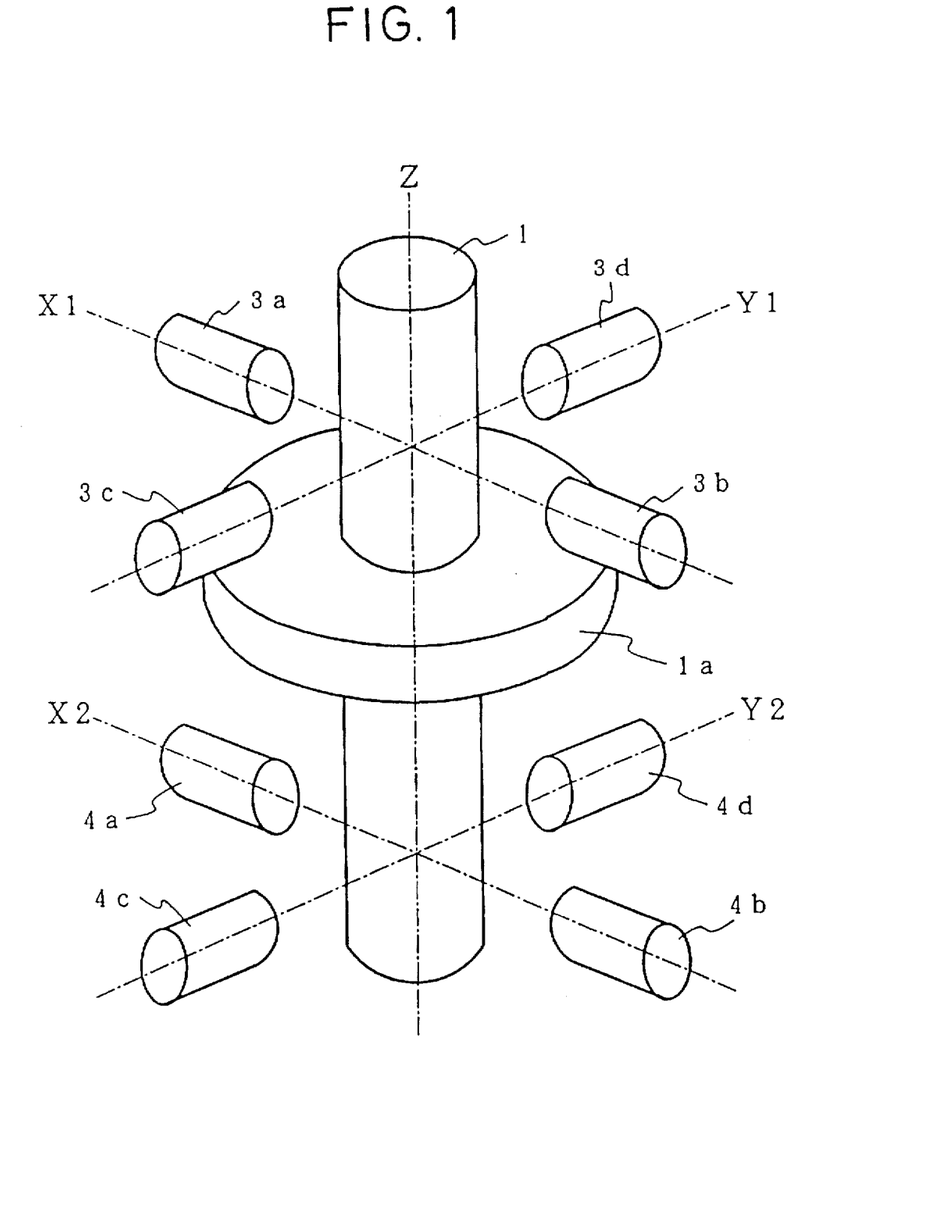
FIG. 1 is a perspective view schematically showing part of a structure of a shaft part of a magnetic bearing device.

FIG. 1 shows a position relation between an electromagnet and a rotor in a magnetic bearing device according to a first embodiment of the present invention. On the upper and the lower part of the rotor 1, upper side electromagnets 3a, 3b, 3c and 3d and lower side electromagnets 4a, 4b, 4c and 4d are respectively arranged by sandwiching the rotor 1. When the axial direction of the rotor 1 is set as a Z-axis, the direction in which the upper side electromagnet 3a and the upper side electromagnet 3b are opposed to each other is set as an X1-axis direction and the direction in which the upper side electromagnet 3c and the upper side electromagnet 3d are opposed to each other is set as a Y1-axis direction. The X1-axis and Y1-axis are orthogonal with each other and both the X1-axis and Y1-axis are vertical with respect to the Z-axis. In the same manner, when the directions in which lower side electromagnets 4a and 4b as well as lower side electromagnets 4c and 4d are opposed to each other are set as a X2-axis direction and Y2-axis direction as shown in FIG. 1, the X2-axis and the Y2-axis are orthogonal with each other, and the X2-axis and Y2-axis are vertical to the Z-axis.

In each of the electromagnets 3a, 3b, 3c and 3d and the electromagnets 4a, 4b, 4c and 4d, a radial direction displacement sensor (not shown) is arranged for detecting a displacement in the radial direction (X1-axis, X2-axis direction, and Y1-axis and Y2-axis directions) of the rotor 1, respectively.

The rotor 1 is magnetically levitated in the radial direction (X-axis, Y-axis direction) by the magnetic force generated by each of the electromagnets 3a, 3b, 3c and 3d and 4a, 4b, 4c and 4d. Further, the exciting current of each of the electromagnets 3a, 3b, 3c, 3d, 4a, 4b, 4c and 4d is controlled to levitate and hold the rotor 1 at a predetermined position by controlling the feedback of the exciting current on the basis of the output of each displacement sensor (not shown).

In the intermediate part of the rotor 1, a disc-like thrust bearing rotor part 1a is formed and an axial direction electromagnet (not shown) is arranged to sandwich this thrust bearing rotor portion 1a between the upper part and the lower part of the axial direction electromagnet. Further, an axial direction displacement sensor is provided for detecting the displacement in the axial direction of the rotor 1, on the lower end, for example, of the rotor 1. The rotor 1 is magnetically levitated and held in the axial direction by the feedback control of the axial direction exciting current in the axial direction electromagnet (not shown) depending on the output of the axial direction displacement sensor.

Incidentally, the rotor 1 is rotated and driven by the motor (not shown). Further, in this embodiment, the rotor 1 is provided with a rotary encoder (not shown) at the shaft end part of the rotor 1, the rotary encoder outputting one INDEX pulse signal for each one rotation of the rotor 1 and r CLOCK pulse signals for each one rotation of the rotor 1 when one rotation is divided into r.

Figure 2:
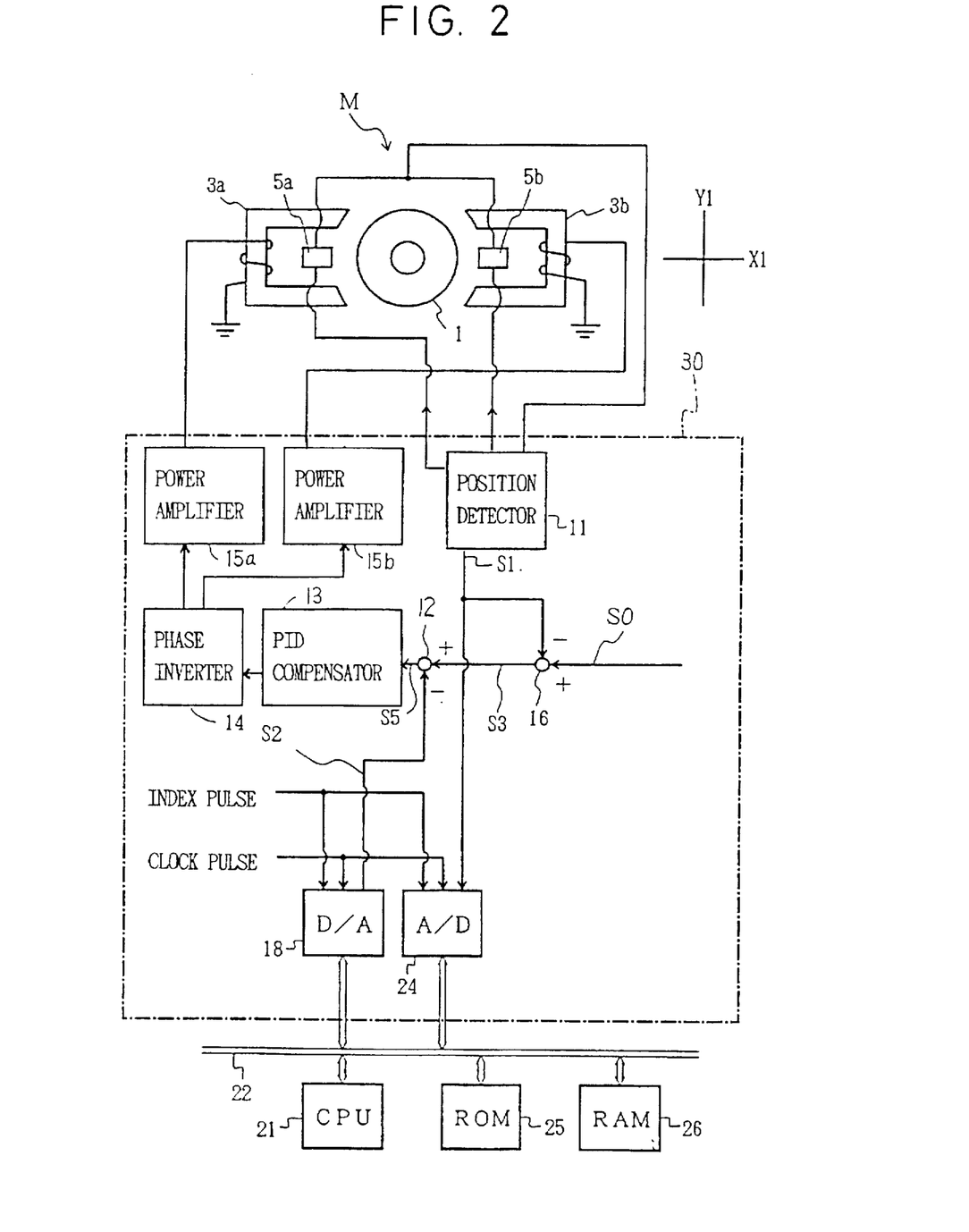
FIG. 2 is a block diagram showing part of a structure of a control system of a magnetic bearing device according to a first embodiment of the present invention.

FIG. 2 shows part of a structure of a control system in a magnetic bearing device according to the first embodiment. Incidentally, although FIG. 2 shows only a control part 30 of the electromagnets 3a and 3b, a similar control part is provided on other electromagnets 3c and 3d, 4a and 4b, and 4c and 4d. This control part 30 will be explained hereinbelow as a typical example.

As shown in FIG. 2, in the vicinity of the upper side electromagnets 3a and 3b, radial direction displacement sensors 5a and 5b are arranged for detecting the displacement in the radial direction of the rotor 1 (X-axis direction). In this embodiment, as radial direction displacement sensors 5a and 5b, for example, an inductance displacement sensor is used, but an electrostatic capacitance displacement sensor, and an excess-current displacement sensor or the like may be used. To the radial direction displacement sensors 5a and 5b, a position detection circuit 11 is connected for obtaining a sensor signal S1 which corresponds to the position displacement of the rotor from the output.

The position detecting circuit 11 is connected to a calculator 16 for subtracting the sensor signal S1 from a reference signal S0 to calculate a deviation signal S3. Further, the calculator 16 is connected to a calculator 12 for subtracting a correction signal S2 from the deviation signal S3. A position instruction signal S5 which is an output from the calculator 12 is supplied to a PID operation part 13 for a signal processing such as proportional operation, integration operation and differentiation operation or the like. Further, the PID operation part 13 is connected to a phase inverter 14.

As a consequence, the signal processed at the PID operation part 13 becomes a signal whose phase has been mutually reversed at a phase inverter 14 with the result that the signal has been reversed in phase. Then the signal is supplied to power amplifiers 15a and 15b. The power amplifiers 15a and 15b supply to the exciting coil of each of the electromagnets 3a and 3b an exciting current that has been amplified in accordance with a signal from the phase inverter 14.

Here, the reference signal S0 refers to a signal for instructing a position with which the shaft center of the rotor 1 agrees as a levitation position to the intermediate position between the electromagnets 3a and 3b located opposite to each other. The value is definite.

In the magnetic bearing device of the embodiment, the exciting current of the upper side electromagnets 3a and 3b is fed back and controlled on the basis of the output from the radial direction displacement sensors 5a and 5b by a control circuit which comprises the aforementioned position detecting circuit 11, the calculator 12, the PID operating part 13, the phase inverter 14, and power amplifiers 15a and 15b.

Further, in the magnetic bearing device of the present invention, the position detecting circuit 11 is connected to an A/D converter 24. To the A/D converter 24, an INDEX pulse signal which is an output for each rotation is supplied to a rotary encoder (not shown) for each rotation of the rotor and a CLOCK pulse signal is output r times for each one rotation when one rotation is divided into r. Further, the A/D converter 24 is connected to the CPU 21 via a bus line 22 such as each kind of interface and data bus or the like. A sensor signal S1 obtained at the position detection circuit 11 is also supplied to the CPU 21 via an A/D converter 24 for each rotation angle position in synchronization with a CLOCK pulse signal while starting from an INDEX pulse signal.

The CPU 21 performs each kind of processing based on each kind of program which is stored in a ROM (read only memory) 25. The CPU 21 is constituted in such a manner that each kind of data which is the result of processing is stored in a RAM (random access memory) 26.

The CPU 21 is constituted so as to analyze the frequency of the displacement of the rotor 1 at the time of the rotation from the rotation speed data detected from the rotation angle position (not shown) and a sensor signal S1 for each rotation angle position supplied via an A/D converter 24. Further, the CPU 21 is constituted so as to store in the RAM 26 the rotation frequency which is the result of the analysis and the high order frequency such as second order frequency and third order frequency and phase difference data which is obtained by referring to the INDEX pulse signal. However, information on the displacement of the rotor 1 obtained from the sensor signal S1 is a displacement component to the X1-axis direction (see FIG. 1) at one end part of the rotor 1. Further, the CPU 21 calculates and generates a correction signal S2 for inhibiting the displacement which is synchronous with the rotation of the rotor 1, namely the displacement of the rotation frequency and a higher harmonic wave component such as second order and third order component from the gain and phase data which reverse transfer function data with respect to the closed loop transfer function of the magnetic bearing device reaching to a calculator 16 which is the input point of the sensor signal S1 from the calculator 12 which is the position compensating input point and from the frequency analysis result so that the displacement is supplied to the calculating device 12 which is the compensating point via a D/A converter 18.

In the aforementioned operation, the calculating device 12 generates a position instruction signal S5, which is supplied to the PID operation part 13 so that the upper side electromagnets 3a and 3b generate a magnetic force for eliminating a displacement component of the rotor 1 in the X-axis direction.

Incidentally, the INDEX pulse signal and the CLOCK pulse signal are supplied to the D/A converter 18 from the rotary encoder (not shown). The CPU 21 controls the D/A converter 18 so that a correction signal S2 is output in synchronization with the CLOCK pulse signal for each rotation angle position by starting from the INDEX pulse signal.

Further, control parts for other electromagnets 3c and 3d, 4a and 4b and 4c and 4d are respectively connected to the CPU 21 via a bus line 33 in the same manner as the control part 30. The displacement of the rotor 1 is inhibited by respectively supplying a correction signal for inhibiting the displacement of the rotor 1 with respect to each of these control parts.

Next, an operation of the embodiment thus constituted will be explained.

In the beginning, the outline of the operation and the principle of the displacement inhibition will be explained.

In this embodiment, when a displacement is generated at during rotation of the rotor 1, a predetermined correction signal (correction signal S2) is supplied to a servo system (control circuits comprising 11 to 15a, 15b and the like) for the position control of the rotor 1 with the result that a magnetic force is generated as a coercing force with which each of the electromagnets 3a, 3b, 3c, 3d and 4a, 4b, 4c and 4d oppose the displacement. This magnetic force offsets the displacement and the rotor 1 rotates on the geometric central shaft without oscillation.

However, in the actual magnetic bearing apparatus, the displacement of the rotor 1 may include not only a primary component which is synchronous with the rotation, but also a frequency component which is non-synchronous with the high order component and a rotation because of mechanical structure thereof. Consequently, each frequency component of the displacement must be erased for completely inhibiting the displacement.

Then, in this embodiment, the CPU 21 analyzes the displacement state of the rotor 1 from the output signal (sensor signal S1) of each of the radial direction displacement sensors 5a and 5b or the like to obtain a correction signal for offsetting a displacement for each frequency component.

Incidentally, the CPU 21 analyzes the frequency of the rotor 1 independently for each axis, namely for each of the X1-axis and Y1-axis, and X2-axis and Y2-axis. Since the processing is carried out in the similar manner, the frequency analysis in the X1-axis direction will be explained as a typical example.

The displacement of the rotor 1 (in the X1-axis direction) during rotation is detected by the radial direction displacement sensors 5a and 5b to provide a sensor signal S1. The CPU 21 incorporates this sensor signal S1 via the A/D converter as displacement data for each rotation angle position which starts from the INDEX pulse signal. Consequently, the CPU 21 analyzes the frequency of the displacement data for each rotation angle position thereby getting information on the frequency distribution which constitutes the displacement waveform of the rotor 1 during rotation.

The frequency analysis of the displacement is performed by using the harmony analysis method, the distributive Fourier series development or the high speed Fourier development method or the like. Here, an explanation will be given with respect to the harmony analysis method. In other words, the normal curve R(θ) having a cycle of 2π can be represented by the following equation.

$$R(\theta)=a_0+a_1\cos\theta+a_2\cos2\theta+\ldots+a_n\cos n\theta+\ldots+b_1\sin\theta+b_2\sin2\theta+\ldots+b_n\sin n\theta \quad (1)$$

This mathematical expression (1) can be deformed into an equation (2).

$$R(\theta)=a_0+C_1\cos(\theta+\phi_1)+C_2\cos(2\theta+\phi_2)+\ldots+c_n\cos(n\theta+\phi_n)+\ldots \quad (2)$$

$$C_n=\sqrt{(a_n^2+b_n^2)}, \tan\phi_n=-(b_n/a_n), n=1,2\ldots$$

As a result of the aforementioned calculation, $C_n$ and $\phi_n$ can be obtained. Incidentally, $a_0=(1/r)\Sigma Y_k$ $a_n=(2/r)\Sigma Y_k\cos n\theta_k$, $b_n=(2/r)\Sigma Y_k\sin n\theta_k$. Here, symbol r denotes a division data number for one rotation of the rotor 1; $\theta_k$ denotes each rotation angle position; $Y_k$ denotes a displacement of each rotation angle position; n denotes an n-th order number of the frequency; $C_n$ denotes an amplitude of the n-th order frequency; and $\phi_n$ denotes a phase difference of the n-th order frequency from the INDEX pulse signal. Further, the addition scope of Σ ranges from k=1 to k=r.

From the aforementioned mathematical expression, the displacement of the rotor 1 can be obtained as a waveform information on the amplitude and the phase difference up to the n-th order frequency component. Next, the CPU 21 determines a reverse transfer function with respect to the closed loop transfer function reaching a calculator 16 which is the input point of the sensor signal S1 from the calculator 12 which is the compensating input point of a servo system in a control circuit (a circuit comprising the aforementioned components 11 to 15a and 15b or the like). A correction amplitude and a phase data up to the n-th order frequency is calculated by multiplying and adding each of the frequencies of the gain and the phase data of the n-th order frequency obtained from the reverse transfer function and the amplitudes of the n-th order frequency and phase data which are waveform information of the aforementioned displacement. Further, the CPU 21 calculates and generates a correction signal S2 (Rc(θ)) on the basis of the mathematical expression (2) from the correction amplitude and phase difference data. The correction signal S2 is synchronized with the CLOCK pulse signal by starting from the INDEX pulse signal to be supplied via the D/A converter 18 to the calculator 12 which is a compensating input point thereby inhibiting the displacement of the rotation frequency and a higher harmonic wave component of the rotor 1.

Here, the reverse transfer function of the servo system is determined as follows.

In this embodiment, before determining the reverse transfer function, a closed loop transfer function is determined from the calculator 12 which is a compensating input point of the servo system including a control circuit, sensors 5a and 5b, electromagnets 3a and 3b and a rotor 1 to the calculator 16 which is an input point of the sensor signal S1. The transfer function is determined by receiving via an A/D converter 24 a sensor signal S1 obtained when the CPU 21 supplies a vibrating signal with a predetermined amplitude and frequency via a D/A converter 18. In other words, an oscillation signal having predetermined values (such as amplitude and frequency) is input to the servo system, and a sensor signal S1 which is an output corresponding to the oscillation signal is received. Then, the gain is taken from an amplitude ratio of the output which corresponds to the input and the phase is taken from the phase difference of the output with respect to the input so that the frequency is sequentially subtracted to calculate a transfer function in the scope of the required frequency.

When the transfer function is determined, the reverse transfer function is determined. In other words, when the determined transfer function is set to G(s), the reverse function is defined as 1/G(s), the CPU 21 determines the reverse transfer function from this relationship.

Next, the overall operation performed by the magnetic bearing device will be explained hereinbelow.

Figure 3:
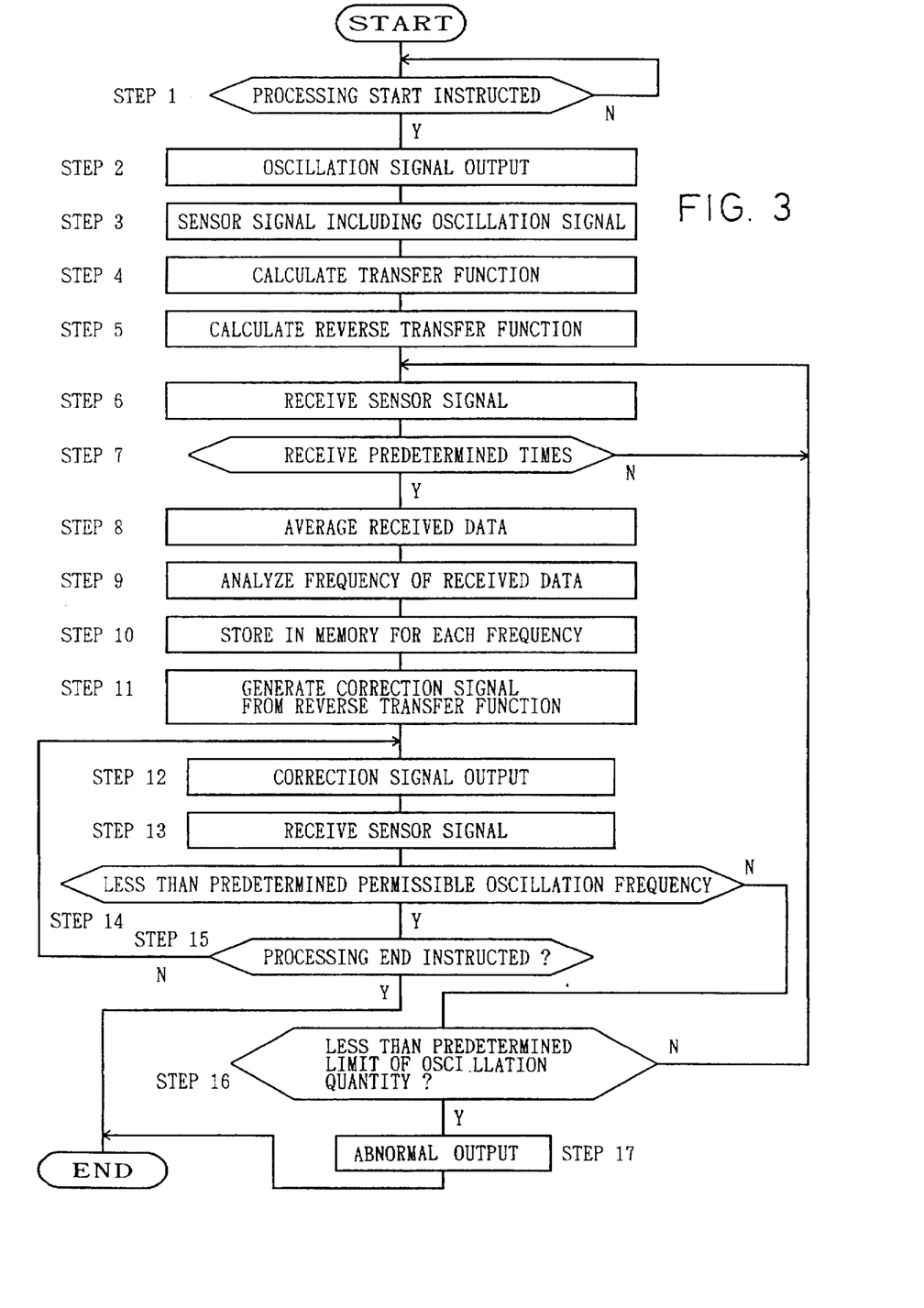
FIG. 3 is a flow sheet showing a flow of the operation of the magnetic bearing device according to the first embodiment of the present invention.

FIG. 3 shows an operational flow of the magnetic bearing device in accordance with the first embodiment. The explanation will be given centering on the processing for inhibiting the displacement of the rotor along the X1-axis. The processing with respect to displacement in the Y1-axis, X2-axis and Y2-axis are performed in a similar manner.

In the beginning, the rotor 1 is magnetically levitated by a magnetic force of each of the electromagnets 3a, 3b, 3c and 3d as well as 4a, 4b, 4c and 4d so that the rotor 1 does not contact the bearing. At this time, since the CPU 21 does not output a correction signal, the position control of the rotor 1 is performed in accordance with the instruction value of the reference signal S0. The rotor 1 is magnetically levitated in the central position of the magnetic bearing device.

Then the operator gives an instruction to initiate a processing for a displacement inhibition (step 1; Y). The CPU 21 applies the oscillation signal with a predetermined amplitude and the frequency to the calculator 12 via D/A converter 18 (step 2). Then, the sensor signal S1 including the oscillation signal is received via the A/D converter 24 (step 3), and the data is stored in a predetermined area of the RAM 26.

Subsequently, in accordance with a predetermined calculation program stored in the ROM 25, the CPU 21 calculates, from the data of the output oscillation signal and the received sensor signal S1, the closed loop transfer function extending from the calculator 12 which is a compensating input point in the servo system including the control circuit, the sensor, electromagnets and the rotor to the calculator 16 which is the input point of the sensor signal S1 (step 4). When the transfer function is determined, the CPU 21 calculates the reverse function thereof (step 5) and the function data is stored in the RAM 26.

Then, when the rotor 1 is rotated with a motor (not shown), the INDEX pulse signal and the CLOCK pulse signal synchronous with the rotation are supplied to the D/A converter 18 or the like, respectively. When the rotation of the rotor 1 assumes to have a predetermined rotating speed, the CPU 21 receives the sensor signal S1 for each rotation angle position starting from the INDEX pulse signal while the rotor 1 rotates once in synchronization with the CLOCK pulse signal (step 6). At this time, in the case where the rotor is displaced, the waveform data on the displacement for one rotation of the rotor 1 is sampled by the CPU 21, and the data is stored in the predetermined storage area of the RAM 26.

Then, the CPU 21 judges whether or not the frequency of the received sensor signal S1 is a predetermined (for example 5 times) (step 7). If the frequency is not the predetermined frequency (step 7; N), the process proceeds to step 6 so that the sampling of the sensor signal S1 is repeated until the frequency becomes the predetermined frequency. When the frequency of the received of the sensor signal S1 becomes the predetermined frequency (step 7; Y), the CPU 21 adds each of the waveform data stored for each sampling followed by dividing the added data by the frequency to average the waveform data so as to store the waveform data for each receiving time in the RAM 26 (step 8). Through this averaging of the waveform data, external disorder elements free from repetition are removed from the received waveform data thereby enabling a stable control of the oscillation.

Next, the CPU 21 analyzes waveform data (average value of a sensor signal S1) obtained at step 8 for each of the frequency component by, for example, the harmony analysis method. The amplitude of each frequency component and the phase difference from the INDEX pulse signal is stored in the RAM 6, respectively (step 10).

The CPU 21 calculates correction data for each of the frequency components by adding and multiplying the amplitude and phase difference data for each frequency obtained at step 10 and a gain and phase difference data corresponding to each frequency obtained from the reverse transfer function at step 5 with the result that the correction data for each of the frequency components is calculated and the correction signal S2 is calculated and generated in the mathematical expression (2) (step 11). Then, the generated correction signal S2 is stored in the RAM 26 to be supplied via a D/A converter 18 to the calculator 12 which is a compensating input point in synchronization with the CLOCK pulse signal starting from the INDEX pulse signal (step 12). In such a process, a correction signal S2 is subtracted and input to a deviation signal S3 which represents a deviation between the reference signal S0 and the sensor signal S1 to become a position instruction signal S5. The position of the rotor 1 is controlled on the basis of the position instruction signal S5.

Next, the CPU 21 receives the sensor signal S1 in synchronization with the CLOCK pulse signal starting from the INDEX signal along with the output of the correction signal S2 (step 13). Then, it is judged that the value of the received sensor signal S1 is determined, that is, it is determined whether the displacement of the rotor 1 has an amplitude less than predetermined permissible value(step 14).

When the amplitude is a predetermined permissible value or less, namely, the value of the correction signal S2 is an appropriate value at which the displacement of the rotor 1 can be sufficiently inhibited (step-14; Y), the processes from steps 12 through 15 are repeated until the operator designates the termination of the processing (step-15; Y). In other words, the processing for inhibiting the displacement of the rotor 1 is continued by outputting the correction signal S2 which is generated at step-11 for each rotation angle position in synchronization with the CLOCK pulse signal subsequently starting from the INDEX pulse signal.

When the displacement quantity is larger than a predetermined permissible value (N), it is judged whether or not the displacement quantity is determined whether it is more than a predetermined limit value or more that can be controlled (step 16). For example, in the spindle or the like, an extremely large imbalance is generated in the weight balance of the whole rotor including tool provided on the rotor 1 because of friction and damage of the tool so that it sometimes happen that the displacement cannot be inhibited with the correction signal S2. When such an over displacement that is difficult to control is detected (step-16; Y), the CPU 21 notifies the operator of the abnormal conditions. For example, an abnormal signal for lightening an alarm lamp is output to notify the operator of the abnormal condition and a signal for designating the termination of the rotation of the rotor 1 is output to the driving control part or the like (not shown)(step-17), thereby terminating the processing.

Consequently, the operator is able to know the time of replacing the tool with the abnormal signal output from the CPU 21.

Further, the oscillation detection sensor (not shown) may be arranged on the spindle apart from the displacement sensors 5a and 5b. When the oscillation of the rotor 1 is incorporated in the CPU 21 with this oscillation sensor signal and a surplus oscillation is detected, the abnormal signal is output in the same manner as described above, and the termination of the rotation of the rotor 1 is designated to terminate the processing.

On the other hand, when the displacement quantity of the rotor 1 obtained from the sensor signal S1 at step 16 (step-16; N), the value of the correction signal S2 is not appropriate because of an error, namely delay or the progress, or increase or decrease in the gain in the measurement of the closed loop transfer function of the servo system. Consequently, the sequence of steps 6 to 14 is repeated until the process proceeds to step 6 so that the value of the correction signal S2 assumes an appropriate value, or the displacement quantity assumes less than a predetermined permissible value or less (step-14; Y). Then the correction signal S2 is corrected to a more appropriate value by renewing the correction signal S2.

In the magnetic bearing device according to the present embodiment, the aforementioned processings are carried out for each of the axes (X1-axis, Y1-axis, X2-axis and Y2-axis).

As described above, in the first embodiment, not only the first order displacement synchronous with the rotation of the rotor 1 but also the displacement of the higher harmonic wave component can be inhibited.

Next, a second embodiment will be described. The like structure as the first embodiment is denoted by the same reference numerals, and the detailed explanation thereof will be appropriately omitted.

Figure 4:
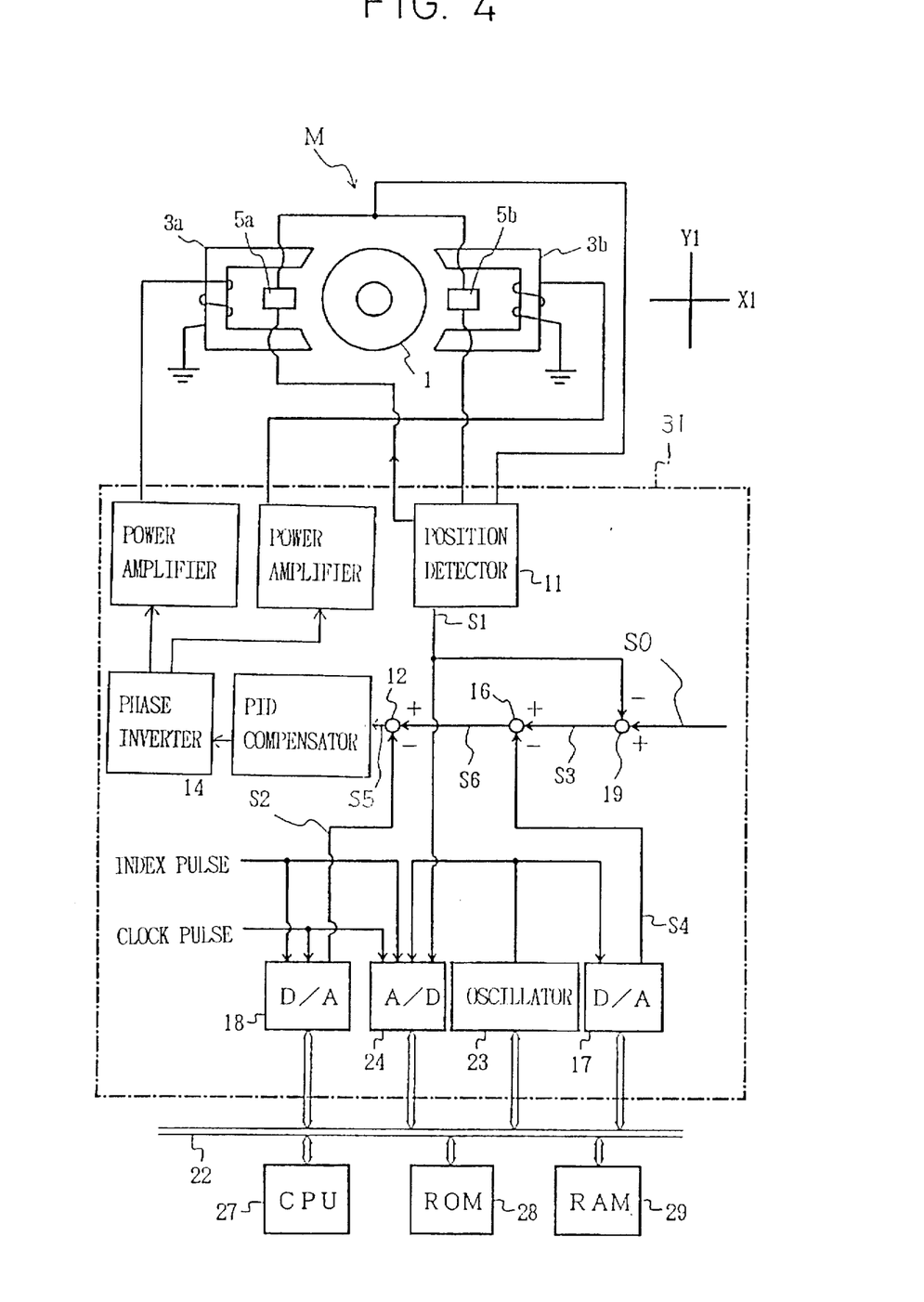
FIG. 4 is a block diagram showing a schematic structure of part of a control system of the magnetic bearing device according to a second embodiment of the present invention.

FIG. 4 shows a schematic structure of a control part 31 in the magnetic bearing device according to the second embodiment.

In the second embodiment, an oscillator 23 for oscillating two pulse signals which are non-synchronous with the rotation of the rotor 1, namely a second INDEX pulse signal and a second CLOCK pulse signal of the oscillator 23 are connected to a bus line 22. Further, to the bus line 22, a D/A converter 17 is connected so that the second INDEX pulse signal and the second CLOCK signal of the oscillator 23 are supplied to this D/A converter 17 and an A/D converter 24.

To a calculator 12 which is a compensating input point, a calculator 16 which is a second compensating point is connected. To this calculator 16, a calculator 19 for calculating a deviation between a reference signal S0 and a sensor signal S1 is connected.

In the second embodiment, the CPU 27 is constituted to generate not only a correction signal S2 for inhibiting a displacement component synchronous with the rotation of the rotor 1 but also a correction signal S4 for inhibiting the displacement component non-synchronous with the rotation. The correction signal S4 is supplied from the CPU 27 to the calculator 16 which is the second compensating input point via the D/A converter 17.

Other aspects of the structure of the second embodiment is the same as the first embodiment.

Next, the operation of the second embodiment which is constituted in this manner will be explained.

For example, when the two spindles are operated in a non-synchronous manner in tool machines or the like, oscillations generated by two spindles interfere with each other so that the rotor of each of the spindles many generate the displacement including the non-synchronous displacement component in the rotation.

The magnetic bearing device of the present invention generates a correction signal S4 for inhibiting a displacement component non-synchronous with the rotation of the rotor 1 thereby inhibiting the non-synchronous displacement component by applying the correction signal S4 to the predetermined servo system. A concrete processing for inhibiting the non-synchronous displacement will be explained hereinbelow.

In the beginning, in the state in which the rotor 1 is magnetically levitated and rotated at a predetermined number of rotation, the displacement of the rotor 1 is analyzed from the sensor signal S1 in the same manner as described in the first embodiment. In other words, the sensor signal S1 is analyzed into each of the frequency components. Then, each of the frequency components is differentiated into a frequency component synchronous with the rotation of the rotor 1 and a non-synchronous frequency component.

With respect to the differentiated non-synchronous frequency component, the CPU 27 determines the cycle in the beginning. Then the CPU 27 outputs from the oscillator 23 the second INDEX pulse signal generated by one pulse for each of the determined frequencies and a second CLOCK pulse signal whose cycle is divided into the same number as the encoder. At the same time, the CPU receives again the sensor signal D1 via A/D converter 24 starting from the second INDEX pulse signal and synchronizing with the second CLOCK pulse signal.

Then the CPU 27 analyzes the frequency of the received sensor signal S1 to obtain waveform data which is non-synchronous with the rotation. At this time, the sensor signal S1 is sampled a plurality times to average the waveform data "i" in the same manner as the processing at step-8 in the first embodiment. When the waveform data is obtained, the CPU 27 uses, in the same manner as the first embodiment, a reverse transfer function in the servo system including the control circuit formed of the position detecting circuit 11, the calculator 12, the PID operating part 13, the phase inverter 14 and power amplifiers 15a and 15b and sensors 5a and 5b, electromagnets 3a and 3b, and the rotor 1 to generate the correction signal S4 for offsetting the non-synchronous oscillation component from this non-synchronous waveform data.

Along with the above processing, the CPU 27 carries out the same processings as in the first embodiment (steps-6 through 11 shown in FIG. 3) to generate a correction signal S4. Then, the correction signal S2 is synchronized with the CLOCK pulse signal starting from the INDEX pulse signal. The correction signal S4 is synchronized with the second CLOCK pulse signal starting from the second INDEX pulse signal. Then the correction signal S2 and the correction signal S4 are output from the D/A converter 18 and the D/A converter 17, respectively.

As a consequence, in the calculator 16 which is the second compensating input point, the correction signal S4 is overlapped with the differential signal S3 which is the deviation between the reference signal S and the sensor signal S1 which is supplied to the calculator 12, or the compensating input point as a position instruction signal S6. On the other hand, in the calculator 12 which is the compensating input point, the correction signal S2 is overlapped with the position instruction signal S6 to generate the position instruction signal S5.

Then, the position of the rotor 1 is controlled on the basis of the position instruction signal S5 including the correction signals S2 and S4. This generates at electromagnets 3a, 3b, 3c, 3d, 4a, 4b, 4c and 4d, magnetic force which offsets the displacement component synchronous with the rotation of the rotor 1 and the non-synchronous displacement component to inhibit the displacement of the rotor 1.

Further, in the second embodiment, a pulse signal which is non-synchronous with the rotation of the rotor 1 is obtained from the oscillator 23. A rotary encoder is provided on the rotor in other spindles which is the oscillation source of the non-synchronous oscillations. Then, the CPU 27 may receive the non-synchronous INDEX pulse signal and the CLOCK pulse signal from the rotary encoder. In this case, the CPU 27 samples the sensor signals in synchronization with these non-synchronous pulse signal received from the rotary encoder or the like of the other spindle to generate the correction signal S4. In addition, the generated correction signal S4 is output in synchronization with these non-synchronous pulse signals.

Further, the non-synchronous displacement component in respective rotation systems may be removed by synchronizing the other devices (spindles) with the rotation of the rotor 1 which causes the non-synchronous displacement. For example, a sensor is provided for detecting the rotation number of the rotor 1 to adjust the driving of the motor in other spindles in accordance with the rotation number detected with this sensor so that the rotation number of other spindles is allowed to agree with that of the rotor 1 or is allowed to be increased to several times thereof. In this synchronous operation, the frequency component that should be compensated in respective rotation system can be decreased. Further, in the magnetic bearing device, the calculator 16 which is the second compensating input point and the oscillator 23 or the like are not required. Consequently, the second embodiment is constituted in the same manner as the first embodiment so that the circuit structure of the control system can be simplified.

Incidentally, in each of the foregoing embodiments, the CPU 21 and 27 determine the transfer function in each servo system through calculation. For example, a servo analyzer (FFT analyzer) is used to measure the transfer function in advance and the data may be stored in the ROM 25. In addition, when the transfer function of each servo system is theoretically determined, the reverse transfer function is determined from the transfer function which is theoretically determined so that the data is preliminarily stored in the ROM 25 or the like. This stored data may be used to generate correction signals S2 and S4 or the like.

Further, in each of the aforementioned embodiments, each rotation angle position is detected with the CLOCK pulse signal of the rotary encoder. At the timer processing (timer division) of the CPU 27, the sensor signal S1 is sampled at a certain time intervals and correction signals S2 and s4 are output starting from the INDEX pulse signal.

In this manner, in accordance with the magnetic bearing device according to the present invention, the displacement other than the primary component of the rotation frequency of the rotor can be also inhibited.

What is claimed is:

1. A magnetic bearing device comprising:
   an electromagnet for magnetically levitating a rotor;
   displacement detecting means for detecting a displacement of the rotor;
   a compensating circuit for compensating a signal of the displacement detecting means for stably supporting the rotor;
   control means for controlling an exciting current of the electromagnet on the basis of a signal compensated by the compensating circuit to control a levitation position of the rotor;

rotation angle position detecting means for detecting a rotational angle position of the rotor;

rotation speed detecting means for detecting a rotation speed of the rotor;

frequency analyzing means for receiving a detection signal of the rotation speed detecting means and receiving a detection signal of the displacement detecting means in synchronization with a detection signal of the rotation angle position detecting means, and for converting the displacement of the rotor for each rotation angle position into a rotation frequency, an amplitude of higher harmonic wave components and phase data;

transfer function measuring means for measuring a transfer function of a feed back loop which reaches a displacement detection point to which the detection signal of the displacement detection means is output from a position correction input point of the compensating circuit;

reverse transfer function calculating means for calculating a reverse transfer function from the transfer function measured by the transfer function measuring means;

correction signal generating means for calculating and generating a correction signal for inhibiting a displacement of the rotor on the basis of the amplitude and phase data obtained by the frequency analyzing means and a gain and phase data obtained from the reverse transfer function calculated by the reverse transfer function calculating means; and correction signal supplying means for supplying a correction signal generated by the correction signal generating means to the position correction input point in synchronization with a detection signal of the rotation angle position detecting means.

2. A magnetic bearing device according to claim 1; further comprising:

identifying means for identifying the rotation frequency and a non-synchronous frequency other than a higher harmonic wave component obtained from the frequency analyzing means and the detection signal of the rotation speed detecting means; and synchronous signal generating means for generating a signal which is synchronous with the non-synchronous frequency identified by the identifying means;

wherein the frequency analyzing means receives the detection signal of the displacement detecting means in synchronization with the synchronous signal for frequency analysis to thereby convert the displacement of the rotor into a frequency which is non-synchronous with the rotation and into an amplitude and phase data of the higher harmonic wave component, and the correction signal generating means calculates and generates a second correction signal for inhibiting the displacement of the rotor which is synchronous with the rotation from the non-synchronous frequency, an amplitude and phase data obtained by the reverse transfer function, and the correction signal supplying means supplies the second correction signal to the position correction input point in synchronization with the synchronous signal.

3. A magnetic bearing device according to claim 1; further comprising averaging means for averaging a plurality of times a displacement detected by the displacement detecting means in accordance with the number of detection times to obtain a displacement with a cycle; wherein the frequency analyzing means analyzes the frequency of the displacement which has been averaged with the averaging means.

4. A magnetic bearing device according to claim 1; further comprising:

oscillation detecting means for detecting an oscillation of the rotor; and abnormality detecting means for detecting an abnormal state of the rotor in the case where at least one of the oscillation detecting means and the displacement detecting means detects a superfluous oscillation and a superfluous displacement.

5. A magnetic bearing device according to claim 2; further comprising averaging means for averaging a plurality of times a displacement detected by the displacement detecting means in accordance with the number of detection times to obtain a displacement with a cycle; wherein the frequency analyzing means analyzes the frequency of the displacement which has been averaged with the averaging means.

6. A magnetic bearing device according to claim 2; further comprising:

oscillation detecting means for detecting an oscillation of the rotor; and abnormality detecting means for detecting an abnormal state of the rotor in the case where at least one of the oscillation detecting means and the displacement detecting means detects a superfluous oscillation and a superfluous displacement.

7. A magnetic bearing device comprising:

a rotor;

an electromagnet for magnetically levitating the rotor;

displacement detecting means for detecting a displacement of the rotor;

rotation angle position detecting means for detecting a rotation angle position of the rotor;

rotation speed detecting means for detecting a rotation speed of the rotor;

a first calculator for subtracting an output signal of the displacement detecting means from a reference signal to output a deviation signal;

a second calculator for outputting a position instruction signal from the deviation signal and outputting a correction signal for inhibiting a displacement of the rotor;

a compensating circuit for controlling an exciting current applied to the electromagnet on the basis of the position instruction signal;

frequency analyzing means for analyzing a frequency of a detection signal of the rotation speed detecting means and a detection signal of the displacement detecting means for converting a displacement of the rotor for each rotation angle position into a rotation frequency, an amplitude of higher harmonic wave components and phase data;

reverse function calculating means for determining the reverse function of the close loop transfer function reaching the first calculator by passing from the second calculator through the compensating circuit; and correcting means for outputting the correction signal for inhibiting the displacement of the rotor in synchronization with a detection signal of the rotation angle position detecting means on the basis of a correction amplitude and phase difference data which are determined from the amplitude and the phase data of the frequency analyzing means and a gain and phase data of the reverse function calculating means.

8. A magnetic bearing device comprising:

a rotor;

at least one pair of electromagnets for magnetically levitating the rotor;

position displacement detection sensors for detecting a position displacement of the rotor and outputting a sensor signal corresponding to the position displacement of the rotor;

a rotation angle position detector for detecting a rotation angle position of the rotor;

a rotation speed detector for detecting a rotation speed of the rotor;

calculating means for subtracting the sensor signal from a reference signal to calculate a deviation signal and outputting a position instruction signal based on the deviation signal and outputting a correction signal for inhibiting a displacement of the rotor;

a compensating circuit for controlling an exciting current applied to the electromagnets on the basis of the position instruction signal outputted by the calculating means;

a frequency analyzer for analyzing a frequency of a detection signal of the rotation speed detector and the sensor signal of the position displacement detection sensors for converting a position displacement of the rotor for each rotation angle position into a rotation frequency, an amplitude of higher harmonic wave component, and phase data;

a reverse function calculator for determining the reverse function of a close loop transfer function reaching the calculating means; and a correction circuit for outputting the correction signal for inhibiting the position displacement of the rotor in synchronization with a detection signal of the rotation angle position detector on the basis of a correction amplitude and phase difference data determined from the amplitude and the phase data of the frequency analyzer and a gain and phase data of the reverse function determined by the reverse function calculator.

9. A magnetic bearing device according to claim 8; wherein the calculating means comprises a first calculator for subtracting the sensor signal from the reference signal to calculate the deviation signal, and a second calculator for outputting the position instruction signal from the deviation signal and outputting a correction signal for inhibiting a displacement of the rotor; and wherein the reverse function calculator determines the reverse function of the close loop transfer function reaching the first calculator by passing from the second calculator through the compensating circuit.

10. A magnetic bearing device comprising:

a rotor;

a plurality of electromagnets for magnetically levitating the rotor;

position displacement detection sensors for detecting a position displacement of the rotor and outputting a sensor signal corresponding to the position displacement of the rotor;

a compensating circuit for compensating the sensor signal of the position displacement detection sensors for stably supporting the rotor;

a control circuit for controlling an exciting current of the electromagnets on the basis of a signal compensated by the compensating circuit to control a levitation position of the rotor;

a rotation angle position detector for detecting a rotational angle position of the rotor and outputting a detection signal corresponding to the rotational angle position;

a rotation speed detector for detecting a rotation speed of the rotor and outputting a detection signal corresponding to the rotation speed of the rotor;

a frequency analyzer for receiving the detection signal of the rotation speed detector and receiving the sensor signal of the position displacement detection sensors in synchronization with the detection signal of the rotation angle position detector, and for converting the position displacement of the rotor for each rotation angle position into a rotation frequency, an amplitude of higher harmonic wave component, and phase data;

a transfer function measuring circuit for measuring a transfer function of a feed back loop which reaches a displacement detection point to which the sensor signal of the position displacement detection sensors is output from a position correction input point of the compensating circuit;

a reverse transfer function calculator for calculating a reverse transfer function from the transfer function measured by the transfer function measuring circuit;

a correction signal generating circuit for calculating and generating a correction signal for inhibiting a displacement of the rotor on the basis of the amplitude and phase data obtained by the frequency analyzer and a gain and phase data obtained from the reverse transfer function calculated by the reverse transfer function calculator; and a correction signal supplying circuit for supplying a correction signal generated by the correction signal generating circuit to the position correction input point in synchronization with the detection signal of the rotation angle position detector.

11. A magnetic bearing device according to claim 10; further comprising an identifying circuit for identifying the rotation frequency and a non-synchronous frequency other than a higher harmonic wave component obtained from the frequency analyzer and the detection signal of the rotation speed detector, and a synchronous signal generating circuit for generating a signal which is synchronous with the non-synchronous frequency identified by the identifying circuit; wherein the frequency analyzer receives the sensor signal of the position displacement detection sensors in synchronization with the synchronous signal for frequency analysis to thereby convert the position displacement of the rotor into a frequency which is non-synchronous with the rotation and into an amplitude and phase data of the higher harmonic wave component; wherein the correction signal generating circuit calculates and generates a second correction signal for inhibiting the position displacement of the rotor which is synchronous with the rotation from the non-synchronous frequency, an amplitude and phase data obtained by the reverse transfer function; and wherein the correction signal supplying circuit supplies the second correction signal to the position correction input point in synchronization with the synchronous signal.

12. A magnetic bearing device according to claim 11; further comprising an averaging circuit for averaging a position displacement detected by the position displacement detection sensors to obtain an averaged position displacement value; wherein the frequency analyzer analyzes the frequency of the averaged position displacement value obtained by the averaging circuit.

13. A magnetic bearing device according to claim 11; further comprising an oscillation detector for detecting an oscillation of the rotor, and an abnormality detector for detecting an abnormal state of the rotor in the case where at least one of the oscillation detector and the position displacement detection sensors detects a superfluous oscillation and a superfluous displacement.

14. A magnetic bearing device according to claim 10; further comprising an averaging circuit for averaging a position displacement detected by the position displacement detection sensors to obtain an averaged position displacement value; wherein the frequency analyzer analyzes the frequency of the averaged position displacement value obtained by the averaging circuit.

15. A magnetic bearing device according to claim 10; further comprising an oscillation detector for detecting an oscillation of the rotor, and an abnormality detector for detecting an abnormal state of the rotor in the case where at least one of the oscillation detector and the position displacement detection sensors detects a superfluous oscillation and a superfluous displacement.

* * * * *